F. WESTERMAN.
DEPOSITING MACHINE.
APPLICATION FILED JULY 1, 1918.

1,392,034. Patented Sept. 27, 1921.
6 SHEETS—SHEET 3.

F. WESTERMAN.
DEPOSITING MACHINE.
APPLICATION FILED JULY 1, 1918.

1,392,034.

Patented Sept. 27, 1921.
6 SHEETS—SHEET 6.

Inventor.
Frederick Westerman
By Pinn Fisher & Clapp
Attys

UNITED STATES PATENT OFFICE.

FREDERICK WESTERMAN, OF CHICAGO, ILLINOIS.

DEPOSITING-MACHINE.

1,392,034. Specification of Letters Patent. Patented Sept. 27, 1921.

Application filed July 1, 1918. Serial No. 242,713.

*To all whom it may concern:*

Be it known that I, FREDERICK WESTERMAN, a citizen of the United States, and a resident of Chicago, in the county of Cook and State of Illinois, have invented certain new and useful Improvements in Depositing-Machines, of which I do declare the following to be a full, clear, and exact description, reference being had to the acompanying drawings, forming a part of this specification.

The present invention has relation to that class of depositing machines whereby confections, such as marshmallow, icing, chocolate or the like, are deposited upon the surfaces of cakes. An example of this type of machine to which my invention is particularly applicable is shown in Letters Patent No. 1,121,431, granted to me December 14, 1914. As the improvements which characterize my present invention relate particularly to the means whereby confection is deposited onto the surface of the cakes, and as the mechanism whereby the cakes are successively advanced in rows beneath such depositing mechanism is fully set forth in my above mentioned Letters Patent, I have not deemed it necessary to illustrate in detail the main frame of the machine, the mechanism for advancing and removing the rows of cakes, nor the gearing by which the operation of the parts is effected, as these will be understood by all persons familiar with machines such as set forth in said Letters Patent, to which reference is made for a more complete understanding of such parts.

The invention consists in the novel features of construction hereinafter described, illustrated in the accompanying drawings and particularly pointed out in the claims at the end of this specification.

Upon the upper portions 10 of the side frames of the main frame of the machine is suitably mounted a hopper or receptacle A wherein will be contained the confection or confections to be deposited upon the surfaces of the cakes to be coated. The cakes may be advanced in rows beneath the hopper A by means of an endless carrier belt 12 that passes over a vertically movable table 13, as in my above mentioned Letters Patent, and when the coating of confection has been applied to the upper surfaces of the cakes, they may be removed by any suitable means, such as are commonly employed in machines of this character.

Figure 1:
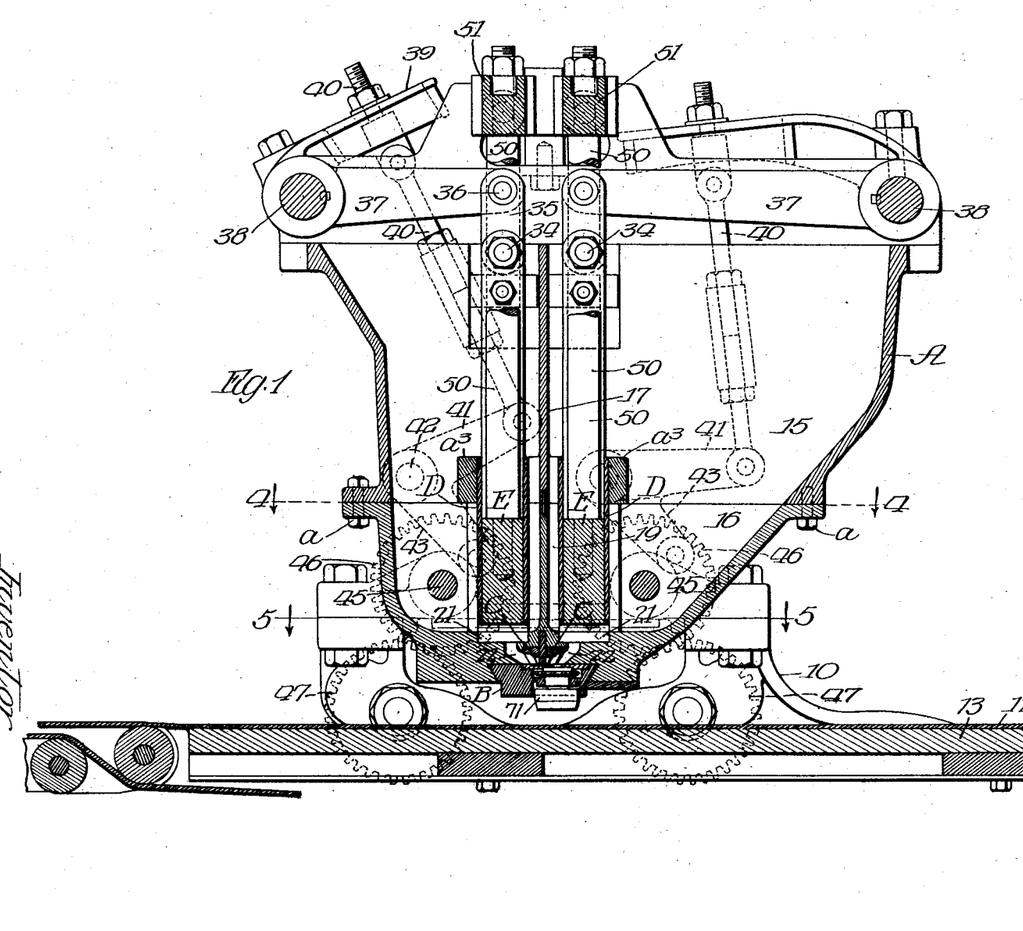
Figure 1 is a view in vertical cross section on line 1—1 of Fig. 2 through the hopper or receptacle that contains the confection to be deposited and through certain parts within said receptacle, other parts being shown in elevation.
Figure 2:
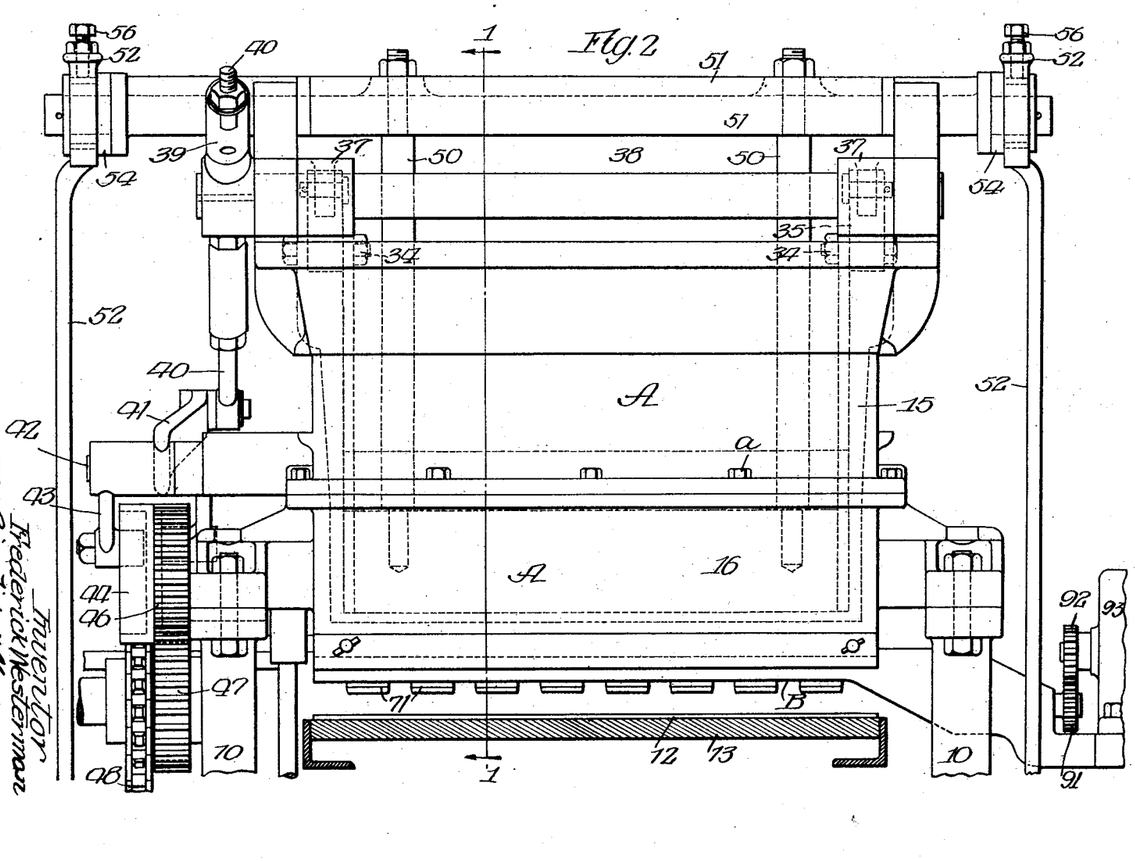
Fig. 2 is a view in front elevation of the hopper or receptacle and parts associated therewith, the table for sustaining the cakes to be coated and the carrier belt for advancing said cakes being shown in section.
Figure 3:
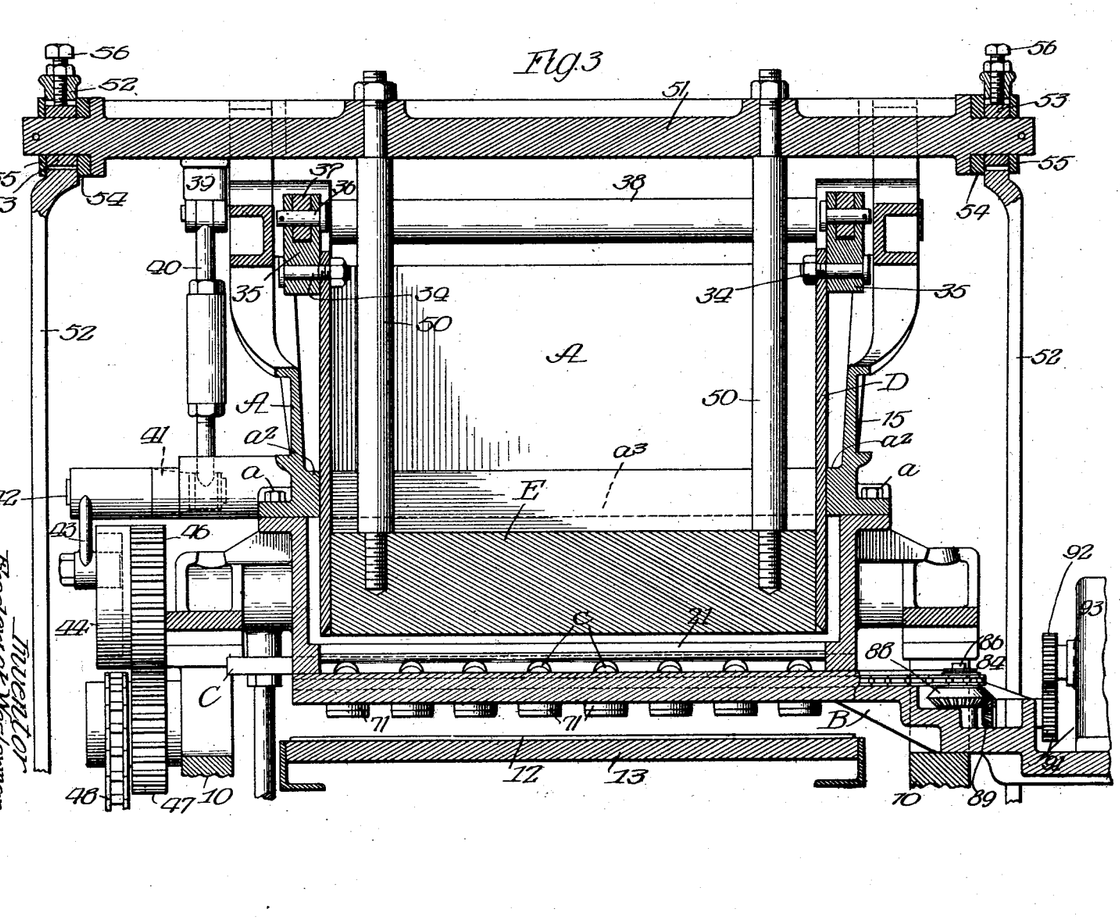
Fig. 3 is a view in vertical cross section on a line through one of the hollow valves and its plunger, the plunger operating rod and certain other parts being shown in elevation.

As shown, the receptacle A consists of the upper and lower portions 15 and 16 bolted together, as at *a* (see Figs. 1, 2 and 3). Preferably, the receptacle A is divided into two separate compartments by a vertical diaphragm or partition 17, so that confections of different kinds may be employed for coating the cakes. The lower portion 16 of the receptacle A (see Figs. 1 and 8) is formed from end to end with a channel or cutaway portion to receive a die carrier plate B, whereby the dies or nozzles through which the coating material will be ejected will be carried. As shown, the die carrier B has dovetail sides one of which will be engaged by the dovetail shoulder 18 and plate 19, and the other of which will be engaged by an adjustable dovetail plate 20, as in the machine of my before mentioned Letters Patent. From end to end of the bottom portion 16 of the receptacle A extend chambers or depressions 21 and from these depressions 21 lead downwardly the channels 22, a pair of such channels 22 (if the receptacle A be formed of two compartments) leading to each discharge nozzle or die, as will hereinafter appear. In the upper face of the die carrier B is set a plate 23 the top of which is flush with the top of the die carrier B. This plate 23 is formed with a series of holes 25 that come opposite the bottoms of the channels 22 at the right hand side of a vertical plate or partition 26 that is in line with the central partition or plate 17 between the two compartments of the receptacle A. In the upper face of the plate 23 (see Fig. 8) are formed a series of channels 27 that coincide with the bottoms of the channels 22 on the left-hand side of the vertical plate 26.

Figure 5:
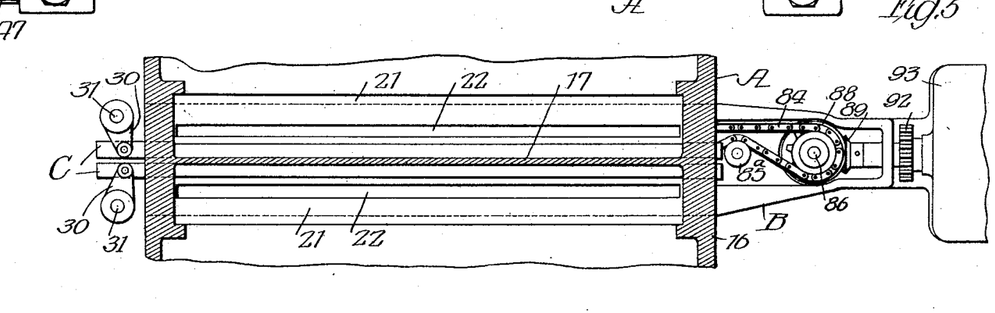
Fig. 5 is a view partly in plan and partly in horizontal section on line 5—5 of Fig. 1.

On each side of the vertical plate 26 is arranged a slide valve C having grooves or channels $c$ corresponding in number and arrangement with the channels 22 that lead from the chambers of the receptacle A. The purpose of the slide valves C is to periodically obstruct the flow of confection through the channels 22, and to accomplish this the slide valves C have their ends extended through one of the end walls of the receptacle A (see Figs. 3 and 5) and are adapted to be shifted by rock arms 30 mounted upon the upper ends of vertical shafts 31. As the mechanism for operating the slide valves C may be the same as in my said Letters Patent No. 1,121,431, I have not deemed it necessary to further illustrate such mechanism.

Figure 8:
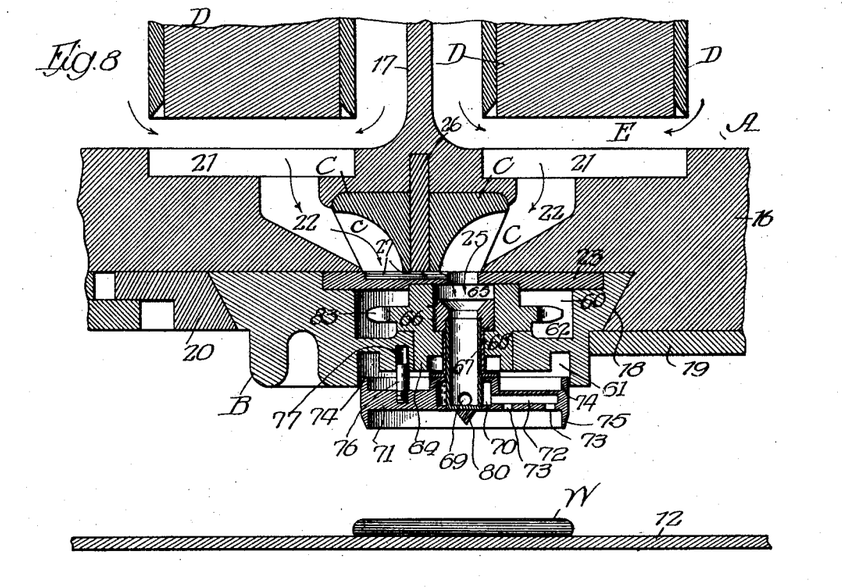
Fig. 8 is an enlarged view in central vertical section through one of the depositing dies or nozzles and adjacent parts.

Immediately above the chambers or depressions 21 in the bottom of the receptacle A are arranged the devices for expelling the marshmallow, chocolate or like confections from the compartments of the receptacle. These devices are the same upon opposite sides of the central partition or division plate 17 and each comprises a four-sided, vertically movable, box-like, hollow valve or casing D the lower portion of which is adapted to enter the depressions or chambers 21. The lower edges of the casings D are preferably beveled as shown in the drawings (Figs. 1 and 8). Each of the casings D is held at a distance from the end walls of the receptacle A (see Fig. 3) by the metal projecting, as at $a^2$, inwardly from the end walls of the receptacle, bars $a^3$ extending preferably from end to end of the receptacle, and each casing D is held at a distance from the vertical division plate 17 (see Figs. 1 and 8) so that the marshmallow or like confection can flow freely around the casing into the depressions or chambers 21 at the bottom of the receptacle A. While I regard it as preferable that the ends of each of the casings D should be spaced away from the end walls of the receptacle A, it is deemed particularly desirable that there shall be a free passage for marshmallow or like confection downward about the side walls of the casing, since in this way a uniform filling of the depressions or chambers 21 is insured when the casings D are lifted above such depressions, as seen in Figs. 1 and 8. Inasmuch as the confections such as marshmallow, icing or the like, are viscous and flow very sluggishly, it is important, particularly where the machine is to be operated at high speed, that provision be made for filing the chambers or depressions 21 as rapidly as possible. The ends of each of the casings D are extended upward (see Figs. 1, 2 and 3) and connected at their tops by bolts 34 to links 35, the upper ends of these links being pivotally connected by bolts 36 to the arms 37 on a rock shaft 38 that is mounted in suitable bearings above the top of the receptacle A. Oscillation will be imparted to each of the rock shafts 38 by an arm 39 to which is adjustably connected a sectional rod 40, the lower end of which is pivotally connected to a rock arm 41 on a stud or shaft 42. On this stud 42 is mounted the hub of a rock arm 43 that carries at its lower end a laterally projecting roller carrying pin adapted to be engaged by the cam 44 mounted on a shaft 45 journaled in suitable bearings at the end of the receptacle A. Each of the cams 44 has connected thereto or formed in piece therewith a gear wheel 46 with which engages a gear wheel 47 to which revolution is imparted as by a sprocket chain 48. This sprocket chain 48 will be driven from the source of power in any suitable manner, as for example, by the mechanism shown in my aforesaid Patent No. 1,121,431.

Within each of the valve casings D (see Figs. 1, 3 and 8) is arranged a long plunger bar E that fits snugly but is adapted to move within the casing. Each of the plunger bars E has connected thereto the upright rods 50, the upper ends of which are connected to a transverse bar 51 extending from end to end across the top of the chamber A. To each end of the plunger bar 51 is adjustably connected a shifting rod or pitman 52. The upper end of each rod or pitman 52 is chambered to receive a sleeve or block 53 (see Fig. 3) that snugly fits the end of the bar 51. As shown, washers 54 and 55 are placed upon the end of the bar 51 at each side of the upper end of the rod 52 and through a threaded hole in the top of the rod 52 passes an adjusting screw 56, the lower end of which bears against the sleeve or block 53. Each of the sleeves or blocks 53 at the opposite ends of the bar 51 is somewhat smaller in vertical direction than the chambered portions of the rods 52, so that there may be a lost motion between the rods 52 and the bar 51, but the extent of this lost motion between these parts can be determined by the adjustment of the screws 56 and by this means the throw of each of the plunger bars E may be accurately adjusted. Any suitable means may be employed for imparting movement to the bars 52 from the source of power, such for example, as the mechanism shown in my aforesaid Patent No. 1,121,431.

Figure 4:
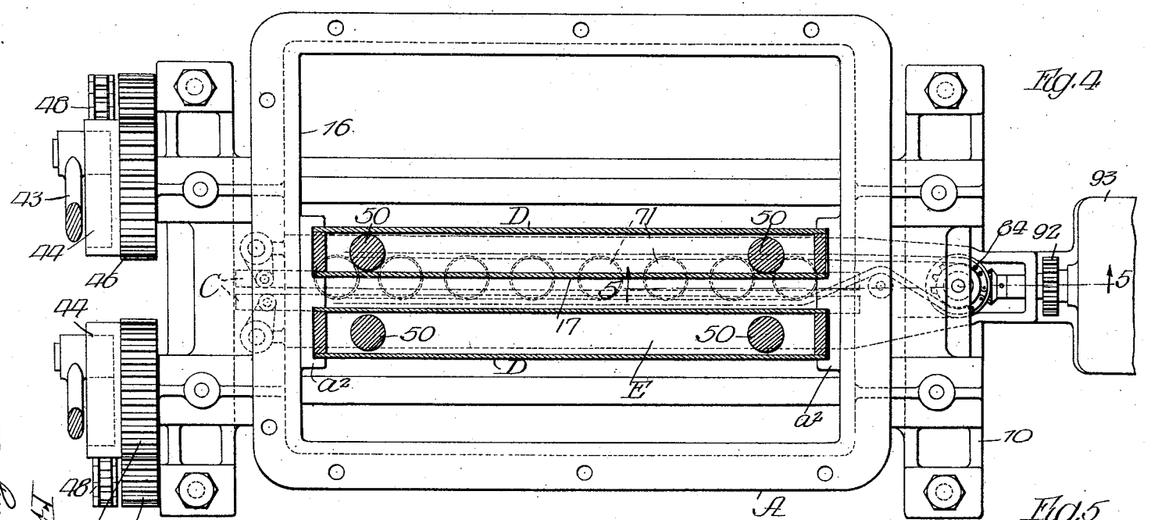
Fig. 4 is a view, partly in plan and partly in horizontal section, on line 4—4 of Fig. 1.
Figure 9:
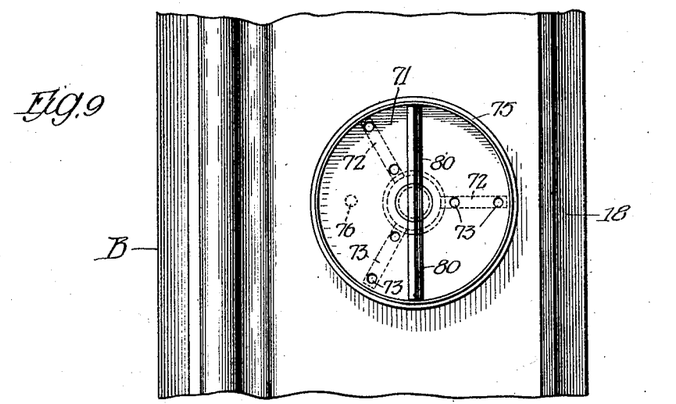
Fig. 9 is an inverted plan view showing a portion of the bottom of the hopper or receptacle and one of the depositing dies or nozzles.

The depositing dies or nozzles carried by the die plate B will next be described. These dies or nozzles are arranged in a row extending from end to end of the bottom of the receptacle A (see Figs. 2, 3 and 4). The die plate B is formed beneath the plate 23 (see Figs. 1 and 8) with upper and lower chambered portions 60 and 61 at opposite sides of the horizontal wall 62. In the horizontal walls 62 is formed a series of circular openings each of which is adapted to receive a revoluble member 64, the upper portion of which member 64 is held within a seat formed on the under side of the plate 23. The upper portion of each of the members 64 is formed with a chamber 65 in which is placed a block 66 adapted to move vertically within the chamber 65. Each of the blocks 66, while free to move vertically within the chamber 65 of the corresponding member 64, will revolve with such member and to this end the outer wall of each of the blocks 66 will be provided with a vertical groove to receive the inner end of a pin passing through the upper portion of the wall of the member 64, or any other suitable means may be employed to connect each block 66 with its member 64 so that these blocks shall revolve with the members 64 while having an independent vertical movement with respect thereto, as for example, the pin and hole connections 76 and 77 hereinafter described. To each block 66 is rigidly connected a revoluble tubular conduit 67 that has a closed bottom and that passes through a sleeve 68 having a flanged lower end that bears upon the upper wall of an annular chamber 70 formed in the die or nozzle 71 around the lower portion of the tube 67. The sleeve 68 is free to rise and fall with the tubular conduit 67, the purpose of this sleeve being simply to give a better bearing for the movement of the conduit through the hole that is formed beneath the chamber 65, and the vertical movement of the members 68 and of the tubular conduit 67 is due to the pressure of the cakes on the flanges of the nozzles as the cakes are lifted to receive the deposit of confection thereon. The die or nozzle 71 is formed with a series of radial channels 72 (see Fig. 9) leading from the annular chamber or channel 70, each of these radial channels 72 being formed with downwardly opening ports 73. The die or nozzle 71 is formed at its top with an annular guide flange 74 and at its bottom with a depending annular flange 75. A pin 76 projecting upwardly from the die or nozzle 71 into a hole 77 in the horizontal wall 62 serves to prevent the die partaking of the revolution that will be imparted to the tubular conduit 67, while permitting it to rise and fall with the conduit. The lower end of the tubular conduit 67 is provided with an opening 69 through which confection will pass from the conduit into the annular channel 70. To the closed lower end of the conduit 67 are connected the radial arms 80 that are somewhat shallower than the space circumscribed by the annular flange 75 of the conduit or nozzle and the purpose of these radial arms is to give a smooth and even surface to the coating of icing, marshmallow or like confection after it has been applied to the cakes. In order to aid in the effective action of the radial arms 80, these arms are preferably made with one or more inclined faces, as shown.

My purpose in mounting each die or nozzle 71 so that it can have a slight upward movement is to compensate for any slight variation in the thickness of the cakes or irregularities in their surfaces, and it will be understood that when the carrier belt 12 whereby the cakes are supported is lifted to present the cakes W (see Fig. 8) to the rows of dies or nozzles, the flange or apron 75 of each nozzle will rest upon the corresponding cake beneath it and as the carrier belt 12 reaches the limit of its upward movement, a slight lifting of the die or nozzle will occur.

Figure 6:
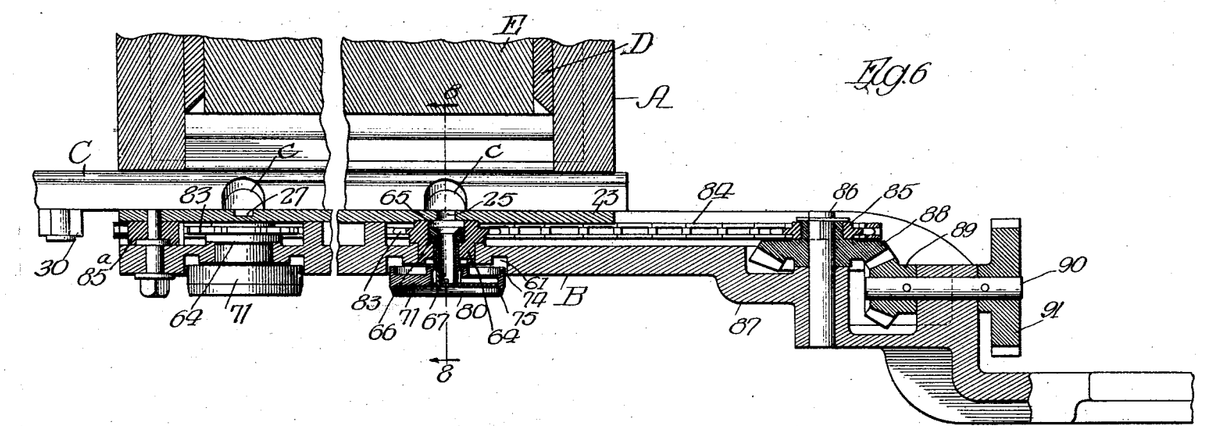
Fig. 6 is an enlarged view in vertical section (parts being shown in elevation) through the depositing or distributing valves and nozzles, their operating mechanism and certain of the adjacent parts.
Figure 7:
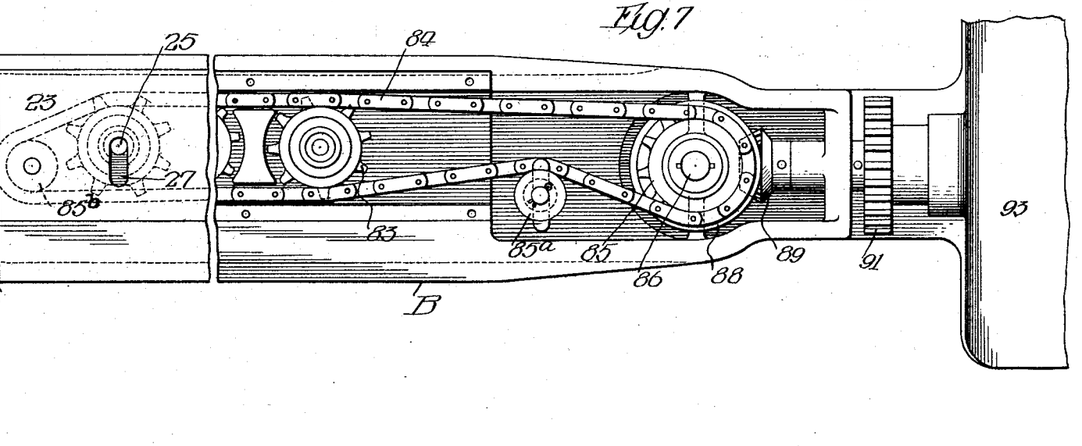
Fig. 7 is a plan view of the operating mechanism illustrated in Fig. 6, parts being broken away.

To impart revolution to the radial spreading or smoothing arms 80, I prefer to provide the mechanism next to be described: Each of the revoluble members 64 (see Fig. 3 and Figs. 4 to 8) is provided with a sprocket wheel 83 that will be engaged by a sprocket chain 84. This sprocket chain 84 will pass around the driving sprocket wheel 85 and around idler wheels 85$^a$ and 85$^b$, as clearly shown in Figs. 6 and 7 of the drawings, one of the idler wheels 85$^a$ being preferably adjustable to tighten the chain 84. The driving sprocket wheel 85 is mounted upon the upper end of a shaft 86 that is suitably journaled in a part 87 projecting from one end of the die carrier B, as clearly shown in Figs. 6 and 7 of the drawings. This sprocket wheel 85 is keyed to revolve with the bevel gear wheel 88 fixed to the shaft 86, which gear wheel meshes with a bevel pinion 89 that is keyed to the short shaft 90. Upon the outer end of the shaft 90 is keyed a gear wheel 91 (see Figs. 3, 6 and 7) that meshes with a corresponding pinion 92 mounted upon the outer end of a shaft extending from an electric motor 93 or other suitable source of power.

From the foregoing description, the operation will be seen to be as follows, it being assumed that the receptacle A is formed of two compartments and that both compartments contain confections to be deposited: Inasmuch as the casings D in which are mounted the plunger bars E are surrounded by confection, the prompt and uniform filling of the depressions or chambers 21 at the bottom of the receptacle A with the confections is insured and the confection will flow downward into and through the channels 22 that communicate with the bottom. Assuming that the slide valves C are in such position that their channels c coincide with the channels 22 (see Figs. 1 and 8) and that confection has passed downward and into the tubular conduit 67 and radial channels 72, the first operation will be the descent of the hollow valves or casings D into the depressions 21, this descent of the casings D occurring in advance of the downward movement of the plungers E. When the hollow valves or casings D have entered the depressions 21, a further supply of material from the compartments of the receptacle A into the depressions or pockets 21 is arrested, while a predetermined quantity of confection is retained in the depressions or pockets 21 and in the lower part of the casings D, in readiness to be expelled therefrom by the plungers E. The plungers E will next descend and force the confections downward through the channels 22, c, 27 and 25 into the tubular conduit 67 and thence through the port 69, the annular channel 70 and radial channels 72 and ports 73 onto the surfaces of the cakes W, which at such time will have been lifted to proper position to receive the confection by the vertical movement of the carrier belt 12. It will be understood that as the carrier belt 12 thus lifts the cakes, the upper surfaces of the cakes will contact with the depending flange or apron 75 of each of the dies or nozzles 71 which will yield slightly so as to compensate for any variation in the thickness of the cakes. When the plungers E complete their downward movement to expel the confections onto the surfaces of the cakes, the slide valves C will be shifted to close the ports 22 from the compartments of the receptacle A. During the deposit of the confections through the openings 73 in the die or nozzle 71, or at least during the latter part of this operation and as it is completed, the revolution imparted to the radial arm or arms 80 beneath each die or discharge nozzle through the mechanism hereinbefore described, will cause a uniform spreading of the confection or confections over the surface of each of the cakes, thus giving a smooth surface to the confection and insuring a uniformity of depth of the coating.

It will be understood, of course, that the mechanism whereby the several parts will be driven will operate in such timed relation as to effect the best results and the adjustment of the means for determining the throw of the valve casings D and plungers E will enable the accurate discharge of the confections onto the surfaces of the cakes to be effected.

While I have described what I regard as the preferred embodiment of my invention, it will be understood that the precise details above set forth may be varied without departing from the spirit of the invention and that features of the invention may be employed without its adoption as an entirety.

Having thus described my invention, what I claim as new and desire to secure by Letters Patent is:—

1. A depositing machine comprising the combination with a receptacle for material to be deposited having a discharge port at its bottom, of a hollow valve arranged within said receptacle to control the flow of material through said discharge port, a plunger within said hollow valve for forcing the material from the same receptacle the discharge port whereof said hollow valve controls, and means for operating said hollow valve and plunger in timed relation.

2. A depositing machine comprising the combination with a receptacle for material to be deposited having a discharge port at its bottom, of a reciprocatory hollow valve having its lower end arranged to control the flow of material through said discharge port, a reciprocatory plunger within said hollow valve for forcing material from the same receptacle the discharge port whereof said hollow valve controls, and means for operating said hollow valve and plunger in timed relation.

3. A depositing machine comprising the combination with a receptacle for material to be deposited provided with a discharge port at its bottom, of a reciprocatory hollow valve movable above the bottom of said receptacle to permit material to pass around the lower end of said valve and into said port, a seat for the lower end of said valve to enable it to cut off the flow of material to said port, a plunger within said hollow valve arranged to eject material from the same receptacle the port whereof is controlled by the lower end of said valve, and means for so actuating said valve and said plunger in timed relation that the material is ejected by said plunger after said valve has closed against its seat.

4. A depositing machine comprising the combination with a receptacle for the material to be deposited provided along its bottom with a row of discharge nozzles, of an oblong, hollow, vertically movable valve arranged within said receptacle and extending approximately from end to end thereof and adapted to cut off the flow of material from said receptacle, a vertically movable plunger arranged within said valve for forcing the material therefrom through the discharge nozzles, and means for actuating said valve and said plunger in timed relation.

5. A depositing machine comprising the combination with a receptacle for the material to be deposited, provided at its bottom with a discharge nozzle and with a valve above said discharge nozzle for arresting the flow of material therethrough, of a reciprocatory hollow valve arranged within said receptacle in such manner as to permit the material to flow around the bottom edges of its walls, a reciprocatory plunger within said valve for forcing the material from the receptacle, and means for actuating said valves and plunger in timed relation.

6. A depositing machine comprising a receptacle for material to be deposited provided at its bottom with a seat or compartment to receive said material, a discharge nozzle at the bottom of said receptacle, a valve above said discharge nozzle for arresting the flow of material therethrough, a hollow reciprocatory valve arranged opposite said seat or compartment and adapted to close against the edges thereof, a reciprocatory plunger within said valve for forcing the material therefrom, and means for actuating said valves and plunger in timed relation.

7. A depositing machine comprising a receptacle for the material to be deposited, provided at its bottom with a plurality of discharge nozzles, a hollow, oblong, vertically movable valve arranged within said receptacle and extending approximately from end to end thereof, and serving to control the flow of material through said discharge nozzles, the side walls of said valve being spaced from the walls of said receptacle to permit the flow of material around the bottom edges of said valve walls, an oblong plunger arranged within said valve for forcing the material therefrom, and means for actuating said valve and said plunger in timed relation.

8. A depositing machine comprising a receptacle for the material to be deposited provided at its bottom with a seat or compartment and with discharge nozzles and with channels leading from said seat or compartment to said discharge nozzles, a slide valve for cutting off the flow of material between said seat or compartment and said discharge nozzles, a hollow reciprocatory valve arranged above said seat or compartment and adapted to cut off the flow of material from said receptacle into said seat or compartment, a reciprocatory plunger within said valve to force the material therefrom and through the discharge nozzles, and means for actuating said valve and plunger in timed relation.

9. A depositing machine comprising the combination with a receptacle for material to be deposited, of a vertically movable discharge nozzle arranged at the bottom of said receptacle, a channel for the passage of material from said receptacle to said discharge nozzle, and mechanism within said receptacle for forcing the material through said discharge nozzle.

10. A depositing machine comprising the combination with a receptacle for material to be deposited, of a die carrier supported in the bottom of said receptacle, a plurality of vertically movable dies or nozzles supported by said die carrier, channels through which passes the material from said receptacle to said discharge nozzles, and mechanism within said receptacle for forcing the material through said discharge dies or nozzles.

11. A depositing machine comprising the combination with a receptacle for material to be deposited, a discharge nozzle arranged at the bottom of said receptacle and provided with a depending flange, a rotary spreader arranged within the flange of said discharge nozzle, means for ejecting material through said discharge nozzle on to the cakes to be coated, and means for rotating said spreader.

12. A depositing machine comprising the combination with a receptacle for material to be deposited, a discharge nozzle arranged at the bottom of said receptacle and provided with a depending flange, a rotary spreader arranged within the flange of said discharge nozzle, means for ejecting material through said discharge nozzle onto the cakes to be coated, and means for rotating said spreader, said spreader having a downwardly inclined wall.

13. A depositing machine comprising a receptacle for the material to be deposited, a vertically movable discharge nozzle arranged at the bottom of said receptacle and provided with a depending flange at its outer edge, a rotary spreader bar arranged within the flange of said discharge nozzle, a vertically movable part extending upwardly from said spreader bar through said discharge nozzle, and means connected to said vertically movable part for imparting rotation to said spreader bar.

14. A depositing machine comprising a receptacle for material to be deposited, a discharge nozzle arranged at the bottom of said receptacle and having a depending flange at its outer edge and a plurality of radial channels and an annular channel communicating with said radial channels for the passage of material, a spreader bar beneath said discharge nozzle, and means for imparting rotation to said spreader bar.

15. A depositing machine comprising a receptacle for the material to be deposited, a discharge nozzle arranged at the bottom of said receptacle, said discharge nozzle being provided with a central annular channel and with radial channels leading therefrom, a spreader bar located beneath said discharge nozzle, a tubular conduit extending upwardly from said spreader bar and adapted to receive material from the receptacle, said conduit being provided with a hole for the passage of material to said annular channel, and means connected to said tubular conduit for imparting rotation to said spreader bar.

16. A depositing machine comprising a receptacle for material to be deposited, a vertically movable discharge nozzle arranged at the bottom of said receptacle, a spreader bar arranged at the bottom of said discharge nozzle, a vertically movable tubular conduit connected to said spreader bar, channels for the passage of material from the receptacle to said tubular conduit and from said conduit to said discharge nozzle, and means for imparting rotation to said tubular conduit.

17. A depositing machine comprising a receptacle for the material to be deposited, a series of discharge nozzles arranged at the bottom of said receptacle and having channels for the passage of material therethrough, spreader bars arranged below said discharge nozzles, and suitable gearing for simultaneously imparting rotation to the spreader bars of the several discharge nozzles.

18. A depositing machine comprising a receptacle for the material to be deposited, a series of discharge nozzles arranged at the bottom of said receptacle and having channels for the passage of material therethrough, spreader bars arranged below said discharge nozzles, and suitable gearing for simultaneously imparting rotation to the spreader bars of the several discharge nozzles, said gearing comprising an individual sprocket wheel for each of said discharge nozzles and a common sprocket chain for actuating said sprocket wheels.

19. A depositing machine comprising the combination of a receptacle for material to be deposited, of a discharge nozzle arranged beneath said receptacle and having channels for the passage therethrough of material, a spreader bar below said discharge nozzle, a tubular conduit connected to said spreader bar, a sprocket wheel wherein said tubular conduit is mounted, said conduit being open at its upper end and provided with a perforation adjacent its lower end for the passage of material into the channels of said discharge nozzle, and means for imparting rotation to said sprocket wheel.

FREDERICK WESTERMAN.